United States Patent
Agrawal et al.

(10) Patent No.: US 7,290,150 B2
(45) Date of Patent: Oct. 30, 2007

(54) INFORMATION INTEGRATION ACROSS AUTONOMOUS ENTERPRISES

(75) Inventors: Rakesh Agrawal, San Jose, CA (US); Alexandre Valentinovich Evfimievski, Ithaca, NY (US); Ramakrishnan Srikant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 10/458,443

(22) Filed: Jun. 9, 2003

(65) Prior Publication Data

US 2004/0250100 A1 Dec. 9, 2004

(51) Int. Cl.
  *G06F 11/30* (2006.01)
  *G06F 12/14* (2006.01)
  *G06F 7/00* (2006.01)
  *G06F 17/30* (2006.01)
  *H04L 9/32* (2006.01)

(52) U.S. Cl. .......................... 713/193; 707/3
(58) Field of Classification Search ............. None
  See application file for complete search history.

(56) References Cited

U.S. PATENT DOCUMENTS

| | | | |
|---|---|---|---|
| 5,963,642 A * | 10/1999 | Goldstein | ............ 713/193 |
| 5,978,789 A | 11/1999 | Griffin et al. | |
| 6,148,295 A | 11/2000 | Megiddo et al. | |
| 6,421,657 B1 | 7/2002 | Sinnott, Jr. | |
| 6,449,609 B1 | 9/2002 | Witkowski | |
| 6,477,534 B1 | 11/2002 | Acharya et al. | |
| 6,507,840 B1 | 1/2003 | Ionnidis et al. | |
| 6,519,591 B1 | 2/2003 | Cereghini et al. | |
| 6,532,458 B1 | 3/2003 | Chaudhuri et al. | |
| 6,928,554 B2 * | 8/2005 | Dettinger et al. | ............ 726/19 |
| 2001/0013035 A1 | 8/2001 | Cohen | |
| 2002/0091989 A1 | 7/2002 | Cole et al. | |
| 2002/0161757 A1 | 10/2002 | Mock et al. | |
| 2003/0014373 A1 | 1/2003 | Perge et al. | |
| 2003/0055814 A1 | 3/2003 | Chen et al. | |
| 2003/0061205 A1 * | 3/2003 | Cleghorn et al. | ............ 707/3 |
| 2003/0112969 A1 | 6/2003 | Algesheimer et al. | |

OTHER PUBLICATIONS

Chris Clifton, Murat Kantarcioglu, Jaideep Vaidya, Xiaodong Lin, Micharl Y. Zhu, Purdue University, IN—"Tools for Privacy Preserving Distributed Data Mining", ACM SIGKDD Exploration Newsletter, vol. 4, Issu 2, 2002, pp. 28-34.

Hakan Hacigumus, Bala Iyer, Chen Li, Sharaf Mehrotra, UC Irvine—"Executing SQL Over Encrypted Data in the Databased-Service-Provider Model", Proceedings of the 2002 ACM SIGMOND, International Conference on Management of Data, 2002, pp. 216-227.

N. R. Adam and J. C. Wortman. Security control methods for statistical databases. ACMComputing Surveys, 21(4):515-556, Dec. 1989.

(Continued)

*Primary Examiner*—Kambiz Zand
*Assistant Examiner*—Kristin D Sandoval
(74) *Attorney, Agent, or Firm*—Marc D. McSwain (57) ABSTRACT

A system, method, and computer program product for processing a query spanning separate databases while revealing only minimal information beyond a query answer, by executing only specific information-limiting protocols according to query type.

8 Claims, 2 Drawing Sheets

$V_R$ := ids in $T_R$ $V_R'$ := subset of $V_R$ that match the DNA sequence $V_S$ := ids in $T_S$ that took the drug $V_S'$ := subset of $V_S$ with adverse reaction T gets IntersectionSize($V'_R, V'_S$)

T gets IntersectionSize($V'_R, (V_S - V'_S)$)

T gets IntersectionSize(($V_R - V'_R), V'_S$)

T gets IntersectionSize(($V_R - V'_R), (V_S - V'_S)$)

OTHER PUBLICATIONS

R. Agrawal and J. Kiernan. Watermarking relational databases. In 28th Int'l Conference on Very Large Databases, Hong Kong, China, Aug. 2002.

R. Agrawal, J. Kiernan, R. Srikant, and Y. Xu. Hippocratic databases. In Proc. of the 28th Int'l Conference on Very Large Databases, Hong Kong, China, Aug. 2002.

R. Agrawal, J. Kiernan, R. Srikant, and Y. Xu. Implementing P3P using database technology. In Proc. of the 19th Int'l Conference on Data Engineering, Bangalore, India, Mar. 2003.

R. Agrawal, J. Kiernan, R. Srikant, and Y. Xu. An XPath-based preference language for P3P. In Proc. of the 12th In'l World Wide Web Conference,Budapest, Hungary, May 2003.

R. Agrawal and R. Srikant. Privacy preserving data mining. In ACM SIGMOD Conference on Management of Data, pp. 439-450, Dallas, Texas, May 2000.

S. Ajmani, R. Morris, and B. Liskov. A trusted third-party computation service. Technical Report MIT-LCS-TR-847, MIT, May 2001.

M. Bellare and P. Rogaway. Randon oracles are practical: A paradigm for designing efficient protocols. In Proc. of the First ACM Conf. on Computer and Communications Security, pp. 62-73, Fairfax, Virginia, 1993.

J. C. Benaloh and M. de Mare. One-way accumulators: A decentrallzed alternative to digital signatures. In Advances in Cryptology—EUROCRYPT'93, Workshop on the Theory and Application of Cryptographic Techniques, vol. 765 of Lecture Notes in Computer Science, pp. 274-285, Lofthus, Norway, May 1993. Speinger-Verlag.

D. Boneh. The Decision diffie-hellman problem. In Proc. of the 3rd International Algorithmic Number Theory Symposium, vol. 1423 of Lecture Notes in computer Science, pp. 48-63, Portland, Oregon, USA, Jun. 1998. Springer-Verlag.

C. Cachin, S. Micali, and M. Stadler. Computationally private information retrieval with polyogarithmic communication. In Theory and Application of Cryptographic Techniques, pp. 402-414, 1999.

S. Chawathe, H. Garcia-Molina, J. Hammer, K. Ireland, Y. Papakonstantinou, J. Ullman, and J. Widom. The TSIMMIS project: Integration of heterogeneous Information sources. In 16th Meeting of the Information Processing Society of Japan, pp. 7-18, Tokyo, Japan, 1994.

F. Chin and G. Ozsoyoglu. Auditing and Inference control in statistical databases. IEEE Transactions on Software Eng., SE-8(6):113-139, Apr. 1982.

B. Chor and N. Giboa. Computationally private information retrieval. In Proc. of 29th ACM Symposium on Theory of Computing, pp. 304-313, 1997.

B. Chor, O. Goldreich, E. Kushilevitz, and M. Sudan. Private information retrieval. In IEEE Symposium on Foundations of Computer Science, pp. 41-50, 1995.

U. Dayal and H.-Y. Hwang. View definition and generalization for database integration in a multidatabase system. IEEE Transactions on Software Eng., 10(6):628-645, 1984.

D. Denning, P. Denning, and M. Schwartz. The tracker: A threat to statistical database security. ACM Transactions on Database Systems, 4(1):76-96, Mar. 1979.

W. Diffie and M. Hellman. New directions in crytography. IEEE Transactions on Information Theory, IT-22(6):644-654, Nov. 1976.

D.Dobkin, A. Jones, and R. Lipton. Secure databases: Protection against user influence. ACM Transactions on Database Systems, 4(1):97-106, Mar. 1979.

T. ElGamal. A public key cryptosystem and a signature scheme based on discrete logarithms, IEEE Transactions on Information Theory, IT-31(4):469-472, Jul. 1985.

A. Elmagarmid, M. Rusinkiewicz, and A. Sheth, editors. Management of Heterogeneous & Autonomous Database Systems. Morgan Kaufmann, 1999.

A. Evfimievski, R. Srikant, R. Agrawal, and J. Gehrke. Privacy preserving mining of assiciation rules. In Proc. of the 8th ACM SIGKDD Int'l Conference on Knowledge Discovery and Data Mining, Edmonton, Canada, Jul. 2002.

I. Fellegi. On the question of statistical confidentiality. Journal of the American Statistical Assoc., 67(337):7-18, Mar. 1972.

A. Flat and A. Shamir. How to prove yourself: Practical solutions to identification and signature problems. In A. M. Odlyzko, editor Advances in Cryptology, Proceedings of Crypto 86. vol. 263 of Lecture Notes in computer Science, pp. 186-194. Springer-Verlag, 1987.

Y. Gertner, Y. Ishai, E. Kushilevitz, and T. Malkin. Protecting data privacy in private information retrieval schemes. In ACM Symposium on Theroy of Computing, pp. 151-160, 1998.

O. Goldreich. Secure multi-party computation. Working Drat, Version 1.3, Jun. 2001.

L. M. Haas, R. J. Miller, B. Niswonger, M. T. Roth, P. M. Schwarz, and E. L. Wimmers. Transforming heterogeneous data with database middleware: Beyond integration. IEEE Data Engineering Bulletin, 22(1), 1999.

B. A. Huberman, M. Franklin, and T. Hogg. Enhancing privacy and trust in electronic communities. In Proc. of the 1st ACM Conference on Electronic Commerce, pp. 78-86, Denver, Colorado, Nov. 1999.

P. Ipeirotis and L. Gravano. Distributed search over the hidden web: Hierarchical database sampling and selection. In 28th Int'l Conference on Very Large Databases, Hong Kong, China, Aug. 2002.

N. Jefferies, C. Mitchell, and M. Walker. A proposed architecture for trusted third party services. In Cryptography Policy and Algorithms Conference. Springer LNCS v 1029 pp. 98-104, Jul. 1995.

M. Kantarcioglu and C. Clifton. Privacy-preserving distributed mining of association rules on horizontally partitioned data. In ACM SIGMOD Workshop on Research Issues on Data Mining and Knowledge Discovery, Jun. 2002.

E. Kushilevitz and R. Ostrovsky. Replication is not needed: Single database, computationally-private information retrieval. In Proc. of the IEEE Symp. on Found. of Computer Science (FOCS), 1997.

Y. Lindell and B. Pinkas. Privacy preserving data mining. Journal of Cryptology, 15(3):177-206, 2002.

M. Naor and K. Nissim. Communication preserving protocols for secure function evaluation. In Proc. of the ACM Symposium on Theory of Computing, pp. 590-599, 2001.

M. Naor and B. Pinkas. Oblivious transfer and polynomial evaluation. In Proc. of the 31th ACM Symposium on Theory of Computing, pp. 245-254, Atlanta, Georgia, 1999.

M. Naor and B. Pinkas. Efficient oblivious transfer protocols. In Proc. of the 12th Annual ACM SIAM Symposium on Discrete Algorithms, pp. 448-457, Washington DC, USA, Jan. 2001.

M. Naor, B. Pinkas, and R. Sumner. Privacy preserving auctions and mechanism design. In Proc. of the 1st ACM Conference on Electronic Commerce, pp. 129-139, Denver, Colorado, Nov. 1999.

B. Preneel. Analysis and design of cryptographic hash functions. Ph.D. dissertation, Katholieke Universiteit Leuven, 1992.

M. O. Rabin. How to exchange secrets by oblivious transfer. Technical Memo TR 81, Aiken Computation Laboratory, Harvard University, 1981.

S. J. Rizvi and J. R. Haritsa. Privacy preserving association rule mining. In Proc. of the 28th In'l Conference on Very Large Databases, Aug. 2002.

G. Salton and M. McGill. Introduction toModern Information Retrieval. McGraw Hill, New York, 1983.

A. Shamir, R. L. Rivest, and L. M. Adleman. Mental poker. Technical Memo MIT LCS TM 125, Laboratory for Computer Science, MIT, Feb. 1979.

C. E. Shannon. Communication theory of secrecy systems. Bell System Technical Journal, 28 4:656-715, 1949.

A. Shoshani. Statistical databases: Characteristics, problems and some solutions. In Proc. of the Eigth Int'l Conference on Very Large Databases, pp. 208-213,Mexico City, Mexico, Sep. 1982.

S. W. Smith and D. Safford. Practical private information retrieval with secure coprocessors. Research Report RC 21806, IBM, Jul. 2000.

D. R. Stinson. Cryptography: Theory and Practice, chapter 4. Chapman & Hall/CRC, second edition, 2002.

J. Valdya and C. W. Clifton. Privacy preserving association rule mining in vertically partitioned data. In Proc. of the 8th ACM SIGKDD Int'l Conference on Knowledge Discovery and Data Mining, Edmonton, Canada, Jul. 2002.

G. Wiederhold. Intelligent integration of information. In Proc. of the ACM SIGMOD Conf. on Management of Data, Washington, DC, 1993.

A. C. Yao. How to generate and exchange secrets. In Proc. of the 27th Annual Symposium on Foundations of Computer Science, pp. 162-167, Toronto, Canada, Oct. 1986.

* cited by examiner

$V_R$ := ids in $T_R$ $V_R'$ := subset of $V_R$ that match the DNA sequence $V_S$ := ids in $T_S$ that took the drug $V_S'$ := subset of $V_S$ with adverse reaction T gets IntersectionSize($V_R'$, $V_S'$)

T gets IntersectionSize($V_R'$, ($V_S - V_S'$))

T gets IntersectionSize(($V_R - V_R'$), $V_S'$)

T gets IntersectionSize(($V_R - V_R'$), ($V_S - V_S'$))

INFORMATION INTEGRATION ACROSS AUTONOMOUS ENTERPRISES

FIELD OF THE INVENTION

This invention relates to sharing information using information-limiting protocols. Specifically, the invention computes a query across databases belonging to autonomous entities such that no more information than necessary (e.g. the answer to the query) is revealed from each database to the other databases.

DESCRIPTION OF RELATED ART

A copy of a SIGMOD article "Information Integration Across Autonomous Enterprises" to be published on Jun. 9, 2003 is attached and serves as an Appendix to this application.

BACKGROUND OF THE INVENTION

1. Introduction

Information integration has long been an area of active database research [e.g. see references 12, 16, 21, 27, 48]. So far, this literature has tacitly assumed that the information in each database can be freely shared. However, there is now an increasing need for computing queries across databases belonging to autonomous entities in such a way that no more information than necessary is revealed from each database to the other databases. This need is driven by several trends:

End-to-end Integration: E-business on demand requires end-to-end integration of information systems, from the supply chain to the customer-facing systems. This integration occurs across autonomous enterprises, so full disclosure of information in each database is undesirable.

Outsourcing: Enterprises are outsourcing tasks that are not part of their core competency. They need to integrate their database systems for purposes such as inventory control.

Simultaneously compete and cooperate: It is becoming common for enterprises to cooperate in certain areas and compete in others, which requires selective information sharing.

Security: Government agencies need to share information for devising effective security measures, both within the same government and across governments. However, an agency cannot indiscriminately open up its database to all other agencies.

Privacy: Privacy legislation and stated privacy policies place limits on information sharing. However, it is still desirable to mine across databases while respecting privacy limits.

1.1 Motivating Applications

We give two prototypical applications to make the above paradigm concrete.

Application 1: Selective Document Sharing Enterprise R is shopping for technology and wishes to find out if enterprise S has some intellectual property it might want to license. However, R would not like to reveal its complete technology shopping list, nor would S like to reveal all its unpublished intellectual property. Rather, they would like to first find the specific technologies for which there is a match, and then reveal information only about those technologies. This problem can be abstracted as follows.

We have two databases $D_R$ and $D_S$, where each database contains a set of documents. The documents have been preprocessed to only include the most significant words, using some measure such as term frequency times inverse document frequency [41]. We wish to find all pairs of similar documents $d_R \epsilon D_R$ and $d_S \epsilon D_S$, without revealing the other documents. In database terminology, we want to compute the join of $D_R$ and $D_S$ using the join predicate $f(|d_R \sqcap d_S|, |d_R|, |d_S|) > \tau$, for some similarity function f and threshold $\tau$. The function f could be $|d_R \sqcap d_S|/(|d_R|+|d_S|)$, for instance.

Many applications map to this abstraction. For example, two government agencies may want to share documents, but only on a need-to-know basis. They would like to find similar documents contained in their repositories in order to initiate their exchange.

Application 2: Medical Research Imagine a future where many people have their DNA sequenced. A medical researcher wants to validate a hypothesis connecting a DNA sequence D with a reaction to drug G. People who have taken the drug are partitioned into four groups, based on whether or not they had an adverse reaction and whether or not their DNA contained the specific sequence; the researcher needs the number of people in each group. DNA sequences and medical histories are stored in databases in autonomous enterprises. Due to privacy concerns, the enterprises do not wish to provide any information about an individual's DNA sequence or medical history, but still wish to help with the research.

Assume that the table $T_R$(person_id, pattern) stores whether person's DNA contains pattern D and $T_S$(person_id, drug, reaction) captures whether a person took drug G and whether the person had an adverse reaction. $T_R$ and $T_S$ belong to two different enterprises. The researcher wants to get the answer to the following query:

select pattern, reaction, count(*)

from $T_R$, $T_S$ where $T_R$.person_id=$T_S$.person_id and $T_S$.drug="true"

group by $T_R$.pattern, $T_S$.reaction

We want the property that the researcher should get to know the counts and nothing else, and the enterprises should not learn any new information about any individual.

1.2 Current Techniques

We discuss next some existing techniques that one might use for building the above applications, and why they are inadequate.

Trusted Third Party: The main parties give the data to a "trusted" third party and have the third party do the computation [7, 30]. However, the third party has to be completely trusted, both with respect to intent and competence against security breaches. The level of trust required is too high for this solution to be acceptable.

Secure Multi-Party Computation: Given two parties with inputs x and y respectively, the goal of secure multi-party computation is to compute a function f(x,y) such that the two parties learn only f(x,y), and nothing else. See [26, 34] for a discussion of various approaches to this problem.

Yao [49] showed that any multi-party computation can be solved by building a combinatorial circuit, and simulating that circuit. A variant of Yao's protocol is presented in [37] where the number of oblivious transfers is proportional to the number of inputs and not the size of the circuit. Unfortunately, the communication costs for circuits make them impractical for many problems.

There is therefore an increasing need for sharing information across autonomous entities such that no information apart from the answer to the query is revealed.

SUMMARY OF THE INVENTION

It is accordingly an object of this invention to provide a system, method, and computer program product for processing a query spanning separate databases while revealing only minimal information beyond a query answer, by executing only specific information-limiting protocols according to query type. The invention includes protocols to process queries of these types: intersection, equijoin, intersection size, and equijoin size.

The protocols employ commutative encryption to limit the information revealed beyond the query answer. The query is rejected if no information-limiting protocol exists for the corresponding query type. The invention returns the query answer to a receiver R that has access to database $D_R$ and may optionally share the query answer with a sender S that has access to database $D_S$. The minimal information revealed is either nothing or only pre-specified categories of information.

The foregoing objects are believed to be satisfied by the embodiments of the present invention as described below.

DETAILED DESCRIPTION OF THE INVENTION

2. Minimal Information Sharing 2.1 Security Model

We develop our solutions in a setting in which there is no third party [26]. The main parties directly execute a protocol, which is designed to guarantee that they do not learn any more than they would have learnt had they given the data to a trusted third party and got back the answer.

We assume honest-but-curious behavior [26]. The parties follow the protocol properly with the exception that they may keep a record of all the intermediate computations and received messages, and analyze the messages to try to learn additional information. This behavior is also referred to as semi-honest or passive behavior.

Figure 1:
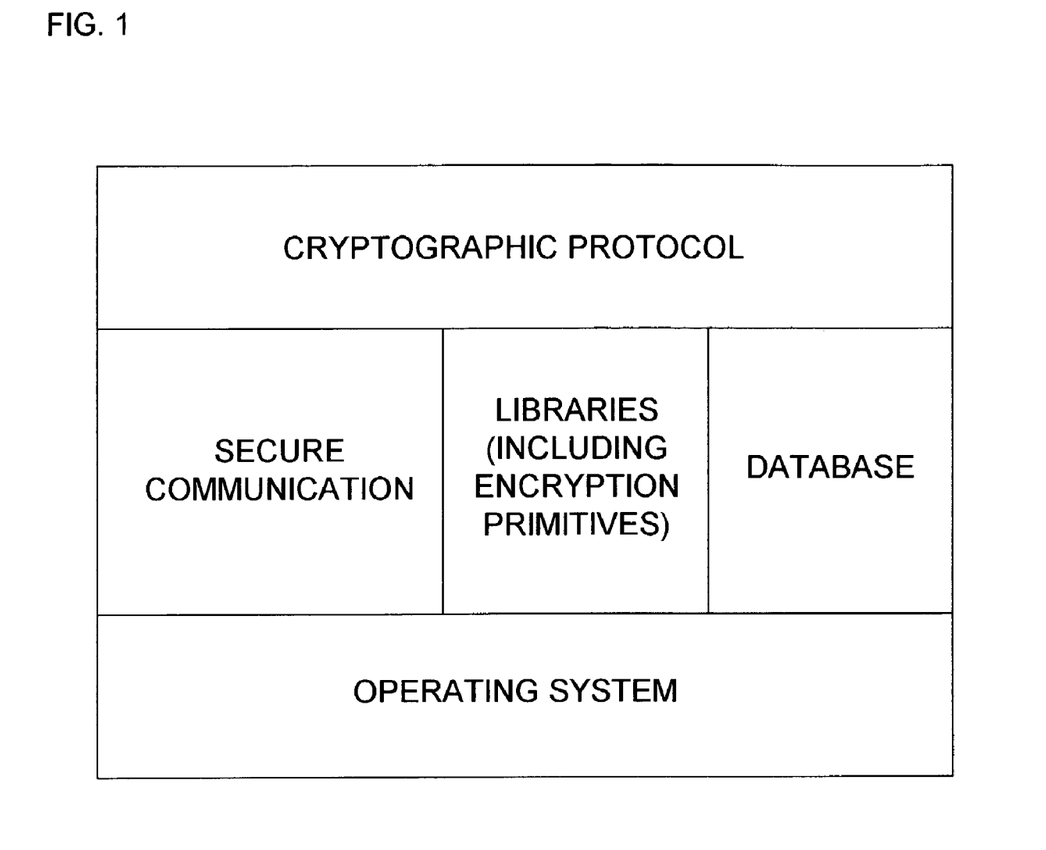
FIG. 1 shows the different components required for building a system for information integration with minimal sharing.

FIG. 1 shows the different components required for building a system for information integration with minimal sharing. Our focus will be on the cryptographic protocol. We assume the use of standard libraries or packages for secure communication and encryption primitives.

2.2 Problem Statement

We now formally state the problem we study in this application.

Problem Statement (Ideal) Let there be two parties R (receiver) and S (sender) with databases $D_R$ and $D_S$ respectively. Given a database query Q spanning the tables in $D_R$ and $D_S$, compute the answer to Q and return it to R without revealing any additional information to either party.

Problem Statement (Minimal Sharing) Let there be two parties R and S with databases $D_R$ and $D_S$ respectively. Given a database query Q spanning the tables in $D_R$ and $D_S$, and some categories of information I, compute the answer to Q and return it to R without revealing any additional information to either party except for information contained in I.

For example, if the query Q is a join $T_R \bowtie T_S$ over two tables $T_R$ and $T_S$, the additional information I might be the number of records in each table: $|T_R|$ and $|T_S|$. Note that whatever R can infer from knowing the answer to the query Q and the additional information I is fair game. For instance, if the query Q is an intersection $V_S \cap V_R$ between two sets $V_S$ and $V_R$, then for all $v \in (V_R - (V_S \cap V_R))$, R knows that these values were not in $V_S$.

We assume that the query Q is revealed to both parties. One can think of other applications where the format of Q is revealed, but not the parameters of Q (e.g., in private information retrieval, discussed in Section 2.4).

2.2.1 Operations

In this application, we focus on four operations: intersection, equijoin, intersection size, and equijoin size.

Let S have a database table $T_S$, and R have a table $T_R$, with both tables having a specific attribute A in their schemas. The attribute takes its values from a given set V. Let $V_S$ be the set of values (without duplicates) that occur in $T_S.A$, and let $V_R$ be the set of values occurring in $T_R.A$. For each $v \in V_S$, let ext(v) be all records in $T_S$ where $T_S.A=v$, i.e., ext(v) is the extra information in $T_S$ pertaining to v. We show how to compute three kinds of queries over $T_S$ and $T_R$:

Intersection: Party R learns the set $V_S \cap V_R$, the value $|V_S|$, and nothing else; party S learns $|V_R|$ and nothing else (Section 3).

Equijoin: Party R learns $V_S \cap V_R$, ext(v) for all $v \in V_S \cap V_R$, $|V_S|$, and nothing else; party S learns $|V_R|$ and nothing else (Section 4).

Intersection Size: Party R learns the values of $|V_S \cap V_R|$, $|V_S|$, and nothing else; party S learns $|V_R|$ and nothing else (Section 5).

Thus in the terminology of our problem statement above, the query Q for the three problems corresponds to $V_S \cap V_R$, $T_S \bowtie T_R$ (with ext(v) used to compute the join), and $|V_S \cap V_R|$ respectively. In all three cases, the additional information I consists of $|V_R|$ and $|V_S|$.

We also extend the intersection size protocol to obtain an equijoin size protocol that computes $|T_S \bowtie T_R|$ (Section 5.2). However, R learns $|V_S|$, the distribution of duplicates in $T_S.A$, and based on the distribution of duplicates, some subset of information in $V_S \cap V_R$. S learns $|V_R|$ and the distribution of duplicates in $T_R.A$.

2.3 Limitations

Multiple Queries While we provide guarantees on how much the parties learn from a single query, our techniques do not address the question of what the parties might learn by combining the results of multiple queries. The first line of defense against this problem is the scrutiny of the queries by the parties. In addition, query restriction techniques from the statistical database literature [1, 44] can also help. These techniques include restricting the size of query results [17, 23], controlling the overlap among successive queries [19], and keeping audit trails of all answered queries to detect possible compromises [13].

Schema Discovery and Heterogeneity We do not address the question of how to find which database contains which tables and what the attribute names are; we assume that the database schemas are known. We also do not address issues of schema heterogeneity. See [21, 29] and references therein for some approaches to these problems.

2.4 Related Work

In [35], the authors consider the problem of finding the intersection of two lists while revealing only the intersection. They present two solutions: the first involves oblivious evaluations of n polynomials of degree n each, where n is the number of elements in the list; the second solution requires oblivious evaluation of n linear polynomials. In the context of databases, n will be quite large. In [28], the authors consider the problem of finding people with common preferences, without revealing the preferences. They give intersection protocols that are similar to ours, but do not provide proofs of security.

In the problem of private information retrieval [11, 14, 15, 32, 45], the receiver R obtains the ith record from set of n records held by the sender S without revealing i to S. With the additional restriction that R should only learn the value of one record, the problem becomes that of symmetric private information retrieval [25]. This literature will be useful for developing protocols for the selection operation in our setting.

The problem of privacy-preserving data mining is also related. The randomization approach [6, 22, 40] focuses on individual privacy rather than on database privacy, and reveals randomized information about each record in exchange for not having to reveal the original records to anyone. More closely related is the work in [33] on building a decision-tree classifier across multiple databases, without revealing the individual records in each database to the other databases. Algorithms for mining associations rules across multiple databases have been described in [31] and [47] for horizontally and vertically partitioned data respectively.

The context for the work presented in this application is our effort to design information systems that protect the privacy and ownership of individual information while not impeding the flow of information. Our other related papers include [2, 3, 4, 5].

3. Intersection 3.1 A Simple, but Incorrect, Protocol

A straightforward idea for computing the intersection $V_S \cap V_R$ would be to use one-way hash functions [38]. Here is a simple protocol that appears to work:

1. Both S and R apply hash function h to their sets, yielding $X_S = h(V_S) = \{h(v) | v \in V_S\}$ and $X_R = h(V_R) = \{h(v) | v \in V_R\}$ 2. S sends its hashed set $X_S$ to R 3. R sets aside all $v \in V_R$ for which $h(v) \in X_S$; these values form the set $V_S \cap V_R$.

Unfortunately, R can learn a lot more about $V_S$ (with honest-but-curious behavior). For any arbitrary value $v \in V - (V_S \cap V_R)$, R can simply compute h(v) and check whether $h(v) \in X_S$ to determine whether or not $v \in V_S$. In fact, if the domain is small, R can exhaustively go over all possible values and completely learn $V_S$.

The intersection protocol we propose next fixes the deficiencies of this protocol.

3.2 Building Blocks

We first describe two building blocks used in the proposed protocols.

3.2.1 Commutative Encryption

Our definition of commutative encryption below is similar to the constructions used in [9, 18, 20, 42] and others. Informally, a commutative encryption is a pair of encryption functions f and g such that f(g(v))=g(f(v)). Thus by using the combination f(g(v)) to encrypt v, we can ensure that R cannot compute the encryption of a value without the help of S. In addition, even though the encryption is a combination of two functions, each party can apply their function first and still get the same result.

Definition1 (Indistinguishability).

Let $\Omega k \sqsubseteq \{0,1\}^k$ be a finite domain of k-bit numbers. Let $D_1=D_1(\Omega k)$ and $D_2=D_2(\Omega k)$ be distributions over $\Omega k$. Let $A_k(x)$ be an algorithm that, given $x \in \Omega k$, returns either true or false. We define distribution $D_1$ of random variable $x \in \Omega k$ to be computationally indistinguishable from distribution $D_2$ if for any family of polynomial-step (with respect to k) algorithms $A_k(x)$, any polynomial p(k), and all sufficiently large k $Pr[A_k(x) | x \sim D_1] - Pr[A_k(x) | x \sim D_2] < 1/p(k)$ where x~D denotes that x is distributed according to D, and $Pr[A_k(x)]$ is the probability that $A_k(x)$ returns true.

Throughout this application, we will use "indistinguishable" as shorthand for "computationally indistinguishable".

Definition2 (Commutative Encryption).

A commutative encryption F is a computable (in polynomial time) function f: KeyF×DomF→DomF, defined on finite computable domains, that satisfies all properties listed below. We denote $f_e(x)$-f(e,x) and use "$\epsilon r$" to mean "is chosen uniformly at random from".

1. Commutativity: For all e, e'∈KeyF we have $f_e \circ f_{e'} = f_{e'} \circ f_e$.

2. Each $f_e$: DomF→DomF is a bijection

3. The inverse $f_e^{-1}$ is also computable in polynomial time, given e.

4. The distribution of $<x, f_e(x), y, f_e(y)>$ is indistinguishable from the distribution of $<x, f_e(x), y, z>$, where x, y, z∈r DomF and e∈r KeyF.

Informally, Property 1 says that when we compositely encrypt with two different keys, the result is the same irrespective of the order of encryption. Property 2 says that two different values will never have the same encrypted value. Property 3 says that given an encrypted value $f_e(x)$ and the encryption key e, we can find x in polynomial time. (Note, we only need this property for the join protocol, not for the intersection protocol). Property 4 says that given a value x and its encryption $f_e(x)$ (but not the key e), for a new value y, we cannot distinguish between $f_e(y)$ and a random value z in polynomial time. Thus we can neither encrypt y nor decrypt $f_e(y)$ in polynomial time. Note that this property holds only if x is a random value from DomF, i.e., the adversary does not control the choice of x.

Example 1 Let DomF be all quadratic residues modulo p, where p is a "safe" prime number, i.e. both p and q=(p−1)/2 are primes. Let KeyF be {1, 2, . . . , q−1}. Then, assuming the Decisional Diffie-Hellman hypothesis (DDH) [10], the power function $f_e(x) \equiv x^e$ mod p is a commutative encryption:

The powers commute:

$$(x^d \bmod p)^e \bmod p = x^{de} \bmod p = (x^e \bmod p)^d \bmod p.$$

Each of the powers $f_e$ is a bijection with its inverse being $f_e^{-1} = f_{e^{-1} \bmod q}$.

DDH claims that for any generating ($\neq$1) element g$\in$DomF the distribution of $<g^a, g^b, g^{ab}>$ is indistinguishable from the distribution of $<g^a, g^b, g^c>$ where a, b, c, $\in$r KeyF. A 3-tuple $<g^a, g^b, z>$ from the DDH can be reduced to our f-tuple $<x, x^e, y, z>$ by taking d $\in$r KeyF and making tuple $<g^d, (g^a)^d, g^b, z>$ Now a plays the role of e, $g^d$ of x, and $g^b$ of y; we test whether $z=(g^b)^a$ or is random. Thus, given DDH, $<x,x^e,y,y^e>$ and $<x,x^e,y,z>$ are also indistinguishable.

3.2.2 Hash Function

Besides a commutative encryption F, we need a hash function to encode the values v$\in$V into x$\in$DomF. The hashes of values should not collide and should "look random," i.e., there should be no dependency between them that could help encrypt or decrypt one hashed value given the encryption of another. Since we apply commutative encryption to the hashed values h(v) instead of v, the input for the encryption function will appear random, and we will be able to use Property 4 of commutative encryption to prove that our protocols are secure.

In the proofs of our security statements we shall rely on the standard random oracle model [8, 24, 46]. We assume that our hash function h: V→DomF is ideal, which means that h(v) can be considered computed by a random oracle: every time h(v) is evaluated for a new v$\in$V, an independent random x $\in$r DomF is chosen for x=h(v).

We assume also that |DomF| is so large compared to $|V_S \times V_R|$ that the probability of a collision is exponentially small. Let N=|DomF|; in the random oracle model, the probability that n hash values have at least one collision equals [46]:

$$Pr[\text{collision}] = 1 - \prod_{i=1}^{n-1} (N-i)/N \approx 1 - \exp(-n(n-1)/2N)$$

With 1024-bit hash values, half of which are quadratic residues, we have N$\approx$2$^{1024}$/2$\approx$10$^{307}$, and for n=1 million $$Pr[\text{collision}] \approx 1 - \exp(-10^{12}/10^{307}) \approx 10^{12}/10^{307} = 10^{-295}.$$

For real-life hash functions, a collision within $V_S$ or $V_R$ can be detected by the server at the start of each protocol by sorting the hashes. If there is a collision between v$\in V_S$ and v'$\in V_R$, it will cause inclusion of v' into the join (or intersection) by R and the disclosure to R of S's records containing v. (For the join protocol (Section 4), R can check whether there was a collision between v$\in V_S$ and v'$\in V_R$ by having S include the value v in ext(v)).

3.3 Intersection Protocol

Our proposed intersection protocol is as follows.

1. Both S and R apply hash function h to their sets:

$X_S = h(V_S)$ and $X_R = h(V_R)$.

Each party randomly chooses a secret key:

$e_S$ $\in$r KeyF for S and $e_R$ $\in$r KeyF for R.

2. Both parties encrypt their hashed sets:

$Y_S = f_{eS}(X_S) = f_{eS}(h(V_S))$ and $Y_R = f_{eR}(X_R) = f_{eR}(h)(V_R))$.

3. R sends to S its encrypted set $Y_R = f_{eR}(h(V_R))$, reordered lexicographically. (If we did not reorder and instead sent the values in the same order as the values in $V_R$, significant additional information could be revealed).

4. (a) S ships to R its set $Y_S = f_{eS}(h(V_S))$, reordered lexico-graphically (b) S encrypts each y$\in Y_R$ with S's key $e_S$ and sends back to R pairs $<y, f_{eS}(y)> = <f_{eR}(h(v)), f_{eS}(f_{eR}(h(v)))>$.

5. R encrypts each y$\in Y_S$ with $e_R$, obtaining $Z_S = f_{eR}(f_{eS}(h(V_S)))$. Also, from pairs $<f_{eR}(h(v)), f_{eS}(f_{eR}(h(v)))>$ obtained in Step 4(b) for v$\in V_R$, it creates pairs $<v, f_{eS}(f_{eR}(h(v)))>$ by replacing $f_{eR}(h(v))$ with the corresponding v.

6. R selects all v$\in V_R$ for which $(f_{eS}(f_{eR}(h(v))) \in Z_S$; these values form the set $V_S \cap V_R$.

3.4 Proofs of Correctness and Security

STATEMENT 1. Assuming there are no hash collisions, S learns the size $|V_R|$ and R learns the size $|V_S|$ and the set $V_S \cap V_R$.

PROOF. By definition, $f_{eS}$ and $f_{eR}$ commute and are bijective. Assuming that hash function h has no collisions on $V_S \cup V_R$, v$\in V_S \cap V_R$ if v$\in V_R$ and $(f_{eS} \circ f_{eR})(h(V)) \in Z_S$, which means that R does recover the correct set $V_S \cap V_R$. Both parties also learn the sizes $|V_R|$ and $|V_S|$, since $|V_R|=|Y_R|$ and $|V_S|=|Y_S|$.

Next we prove that, assuming the parties follow the protocol correctly, they learn nothing else about the other's sets. We first show that even given $$\begin{pmatrix} x_1 & \ldots & x_m \\ f_e(x_1) & \ldots & f_e(x_m) \end{pmatrix}$$

and $x_{m+1}$, there is no polynomial-time algorithm that can determine whether or not a value u is in fact $f_e(x_{m+1})$ LEMMA 1. For polynomial m, the distribution of the 2×m-tuple $$\begin{pmatrix} x_1 & \ldots & x_{m-1} & x_m \\ f_e(x_1) & \ldots & f_e(x_{m-1}) & f_e(x_m) \end{pmatrix}$$

is indistinguishable from the distribution of the tuple $$\begin{pmatrix} x_1 & \ldots & x_{m-1} & x_m \\ f_e(x_1) & \ldots & f_e(x_{m-1}) & z_m \end{pmatrix}$$

where $\forall i$: $x_i$ $\in$r DomF, $z_m$ $\in$r DomF, and e $\in$r KeyF

PROOF. Let us denote the distribution of the upper tuple by $D_m$, and the distribution of the lower tuple by $D_{m-1}$. If $D_m$ and $D_{m-1}$ are distinguishable by some polynomial algorithm A, then $<x, f_e(x), y, f_e(y)>$ and $<x, f_e(x), y, z>$ from Property 4 of commutative encryption are also distinguishable by the following algorithm that takes $<x, f_e(x), y, u>$ as argument:

1. For i=1 ... m−1, let $x_i=f_{ei}(x)$ and $z_i=f_{ei}(f_e(x))$, where $e_i$ ϵr KeyF;

2. Let $x_m=y$ and $z_m=u$;

3. Submit tuple $$\begin{pmatrix} x_1 & \ldots & x_m \\ z_1 & \ldots & z_m \end{pmatrix}$$

to algorithm A and output whatever it outputs.

For i=1 ... m−1, we have $z_i=f_{ei}(f_e(x))=f_e(f_{ei}(x))=f_e(x_i)$, and all $x_i$ are indistinguishable from uniformly random (from Property 4 of commutative encryption). Therefore the distribution of the tuple given to A is indistinguishable from $D_m$ when $<x, f_e(x), y, u>$ is distributed as $<x, f_e(x), y, f_e(y)>$, and from $D_{m-1}$ when $<x, f_e(x), y, u>$ is distributed as $<x, f_e(x), y, z>$. So the assumption that $D_m$ and $D_{m-1}$ are distinguishable leads to the contradiction that Property 4 does not hold.

LEMMA 2. For polynomial m and n, the distribution of the 2×n-tuple $$\begin{pmatrix} x_1 & \ldots & x_m & x_{m+1} & \ldots & x_n \\ f_e(x_1) & \ldots & f_e(x_m) & f_e(x_{m+1}) & \ldots & f_e(x_n) \end{pmatrix}$$

is indistinguishable from the distribution of the tuple $$\begin{pmatrix} x_1 & \ldots & x_m & x_{m+1} & \ldots & x_n \\ f_e(x_1) & \ldots & f_e(x_m) & f_e(z_{m+1}) & \ldots & f_e(z_n) \end{pmatrix}$$

where $0 \leq m \leq n$, $\forall i: x_i, z_i$, ϵr DomF, and e ϵr KeyF.

PROOF. Let us denote by $D''_m$ the distribution of the lower tuple; the upper tuple's distribution is thus $D''_n$.

From Lemma 1, for all j=m+1 ... n, the distributions $D''_j$ and $D''_{j-1}$ are indistinguishable. (The first j columns of $D''_j$ are identical to $D_j$ of Lemma 1, the first j columns of $D''_{j-1}$ are identical to $D_{j-1}$ of Lemma 1, and the last n−j columns of $D''_{j-1}$ and $D''_j$ are just uniformly random numbers.)

Since $D''_{j-1}$ and $D''_j$ are indistinguishable for $\forall j=$ m+1 ... n, and because n is bounded by a polynomial, $D''_n$ is also indistinguishable from any $D''_m$ (where $0 \leq m \leq n$). Let $A_k$ be an algorithm that pretends to distinguish $D''_n$ from $D''_m$, and returns true or false. Now $$Pr[A_k(T) | T \sim D_n^n] - Pr[A_k(T) | T \sim D_m^n] = \quad (1)$$

$$\sum_{j=m+1}^{n} (Pr[A_k(T) | T \sim D_j^n] - Pr[A_k(T) | T \sim D_{j-1}^n])$$

Here k is the number of bits in the tuple values. Consider any polynomial p(k); we want to prove that $\exists k_o \forall k \geq k_o$ the difference (1) is bounded by 1/p(k). Let p'(k)=np(k), which is also a polynomial. We have $\forall j=m+1 \ldots n \exists xk_j \forall k \geq k_j$ the j-th difference in the telescoping sum is bounded by 1/p'(k). Now set $k_o=\max_j k_j$, and we are done:

$$\sum_{j=m+1}^{n} (Pr[A_k(T) | T \sim D_j^n] - Pr[A_k(T) | T \sim D_{j-1}^n]) <$$

$$\sum_{j=m+1}^{n} 1/p'(k) < n/np(k) = 1/p(k).$$

Therefore $D''_n$ and $D''_m$ are computationally indistinguishable.

STATEMENT 2. The intersection protocol is secure if both parties are semi-honest. In the end, S learns only the size $|V_R|$, and R learns only the size $|V_S|$ and the intersection $V_S \cap V_R$.

PROOF. We use a standard proof methodology from multi-party secure computation [26]. If, for any $V_S$ and $V_R$, the distribution of the S's view of the protocol (the information S gets from R) cannot be distinguished from a simulation of this view that uses only $V_S$ and $|V_R|$, then clearly S cannot learn anything from the inputs it gets from R except for $|V_R|$. Note that the simulation only uses the knowledge S is supposed to have at the end of the protocol, while the distinguisher also uses the inputs of R (i.e., $V_R$), but not R's secret keys (i.e., $e_R$). It is important that the distinguisher be unable to distinguish between the simulation and the real view even given R's inputs: this precludes the kind of attack that broke the protocol given in Section 3.1.

The simulator for S (that simulates what S receives from R) is easy to construct. At Step 3 of the protocol, the only step where S receives anything, the simulator generates $|V_R|$ random values $z_i$ ϵr DomF and orders them lexicographically. In the real protocol, these values equal $f_{eR}(h(v))$ for $v \in V_R$. Assuming that, for all $v \in V_R$, the hashes h(v) are distributed uniformly at random (random oracle model), by Lemma 2 and the distributions $$\begin{pmatrix} x_1 & \ldots & x_m \\ f_{eR}(x_1) & \ldots & f_{eR}(x_m) \end{pmatrix}_{x_i=h(v_i), v_i \in V_R} \text{and} \begin{pmatrix} x_1 & \ldots & x_m \\ z_1 & \ldots & z_m \end{pmatrix}_{x_i=h(v_i), v_i \in V_R}$$

where $\forall i: z_i$ ϵr DomF, are indistinguishable. Therefore the real and simulated views for S are also indistinguishable.

The simulator for R (that simulates what R gets from S) will use $V_R$, $V_S \cap V_R$ and $|V_S|$; it also knows the hash function h. However, it does not have $V_S - V_R$. The simulator chooses a key ê ϵr KeyF. In Step 4(a), the simulation creates $Y_S$ as follows:

First, for values $v_i \in V_S \cap V_R$, the simulation adds $f\hat{e}_s(h(v_i))$ to $Y_S$.

Next, the simulation adds $|V_S - V_R|$ random values $z_i$ ϵr Dom F to $Y_S$.

In Step 4(b), the simulation uses the key ê to encrypt each $y \in Y_R$.

Since $e_S$ (real view) and ê (simulation) are both chosen at random, their distributions are identical. According to Lemma 2, one cannot distinguish between the distribution of $$\begin{pmatrix} x_1 & \ldots & x_m \\ f_{eS}(x_1) & \ldots & f_{eS}(x_m) \end{pmatrix}_{x_i=h(v_i),v_i \in V_R} \text{ and } \begin{pmatrix} x_1 & \ldots & x_m \\ f_{eS}(x_{m+1}) & \ldots & f_{eS}(x_n) \end{pmatrix}_{x_i=h(v_i),v_i \in V_S-V_R}$$

and the distribution of $$\begin{pmatrix} x_1 & \ldots & x_m \\ f_{eS}(x_1) & \ldots & f_{eS}(x_m) \end{pmatrix}_{x_i=h(v_i),v_i \in V_R} \text{ and } \begin{pmatrix} x_{m+1} & \ldots & x_n \\ z_{m+1} & \ldots & z_n \end{pmatrix}_{x_i=h(v_i),v_i \in V_S-V_R}$$

The real view corresponds to the upper matrix, and the simulated view to the lower matrix. The only difference is that some variables appear in the view encrypted by $f_{eR}$, which makes the view an efficiently-computable function of the matrix. Therefore the real view and the simulated view are also indistinguishable, and the statement is proven.

4. Equijoin

We now extend the intersection protocol so that, in addition to $V_S \cap V_R$, R learns some extra information ext(v) from S for values $v \in V_S \cap V_R$ but does not learn ext(v) for $v \in V_S - V_R$. To compute the join $T_S \bowtie T_R$ on attribute A, we have ext(v) contain all the records of S's table where $T_S.A=v$, i.e. ext(v) contains the information about the other attributes in $T_S$ needed for the join.

4.1 Idea Behind Protocol

A simple, but incorrect, solution would be to encrypt the extra information ext(v) using h(v) as the encryption key. Since, in our intersection protocol, h(v) could not be discovered by R except for $v \in V_R$ (and similarly for S), one might think that this protocol would be secure. While it is true that h(v) cannot be discovered from $Y_R$ or $Y_S$, h(v) can be discovered from the encryption of ext(v). For any arbitrary value v, R can compute h(v) and try decrypting all the ext(v) using h(v) to learn whether or not $v \in V_S$. In fact, if the domain is small, R can exhaustively go over all possible values and completely learn both $V_S$ and ext(v) for $v \in V_S$.

Rather then encrypt the extra information with h(v), we will encrypt it with a key $\kappa(v) = f_{e'S}(h(v))$, where e's is a second secret key of S. The problem now is to allow R to learn $\kappa(v)$ for $v \in V_R$ without revealing $V_R$ to S. We do this as follows: R sends $f_{eR}(h(v))$ to S, and S sends back $f_{e'S}(f_{eR}(h(v)))$ to R. R can now apply $f^{-1}_{eR}$ to the latter to get $f^{-1}_{eR}(f_{e'S}(f_{eR}(h(v)))) = f^{-1}_{eR}(f_{eR}(f_{e'S}(hv)))) = f_{e'S}(h(v))$.

Note that R only gets $f_{e'S}(h(v))$ for $v \in V_R$, not for $v \in V_S - V_R$.

4.2 Encryption Function K

We now formally define the encryption function K($\kappa$, ext(v)) that encrypts ext(v) using the key $\kappa(V)$. K is defined to be a function $$K: \text{DomF} \times V_{ext} \to C_{ext}$$

with two properties:

1. Each function $K_\kappa(x) \equiv K(\kappa, x)$ can be efficiently inverted (decrypted) given $\kappa$;

2. "Perfect Secrecy"[43]: For any ext(v), the value of $K_\kappa(\text{ext}(v))$ is indistinguishable from a fixed (independent of ext(v)) distribution $D_{ext}$ over $C_{ext}$ when $\kappa \in \text{DomF}$.

Example 2 Let F be the power function over quadratic residues modulo a safe prime, as in Example 1. If the extra information ext(v) can also be encoded as a quadratic residue (i.e., $V_{ext} = \text{DomF}$), the encryption $K_\kappa(\text{ext}(v))$ can be just a multiplication operation:

$$K_\kappa(\text{ext}(v)) = \kappa \text{ext}(v)$$

The multiplication can be easily reversed given $\kappa$, and if $\kappa$ is uniformly random then $\kappa \text{ext}(v)$ is also uniformly random (independently of ext(v)).

4.3 Equijoin Protocol

Let V be the set of values (without duplicates) that occur in $T_S.A$, and let $V_R$ be the set of values that occur in $T_R.A$. For each $v \in V_S$, let ext(v) be all records in $T_S$ where $T_S.A=v$.

1. Both S and R apply hash function h to their sets:

$X_S = h(V_S)$ and $X_R = h(V_R)$.

2. R chooses its secret key er $\in$ KeyF, and S chooses two secret keys: es, e's $\in$ KeyF.

3. R encrypts its hashed set: $Y_R = f_{eR}(X_R) = f_{eR}(h(V_R))$.

4. R sends to S its encrypted set $Y_R$, reordered lexicographically.

5. S encrypts each $y \in Y_R$ with both key $e_S$ and key $e'_S$, and sends back to R 3-tuples $<y, f_{eS}(y), f_{e'S}(y)> = <f_{eR}(h(v)), f_{eS}(f_{eR}(h(v))), f_{e'S}(f_{eR}(h(v)))>$.

5. For each $v \in V_S$, S does the following:

(a) Encrypts the hash h(v) with $e_S$, obtaining $f_{eS}(h(v))$.

(b) Generates the key for extra information using $e'_S$:

$\kappa(v) = f_{e'S}(h(v))$.

(c) Encrypts the extra information:

$c(v) = K(\kappa(v), \text{ext}(v))$.

(d) Forms a pair $<f_{eS}(h(v)), c(v)> = <f_{eS}(h(v)), K(f_{e'S}(h(v)), \text{ext}(v))>$.

The pairs are then shipped to R in lexicographical order.

6. R applies $f^{-1}_{eR}$ to all entries in the 3-tuples received at Step 4, obtaining $<h(v), f_{eS}(h(v)), f_{e'S}(h(v))>$ for all $v \in V_R$.

7. R sets aside all pairs $<f_{eS}(h(v)), K(f_{e'S}(h(v)), \text{ext}(v))>$ received at Step 5 whose first entry occurs as a second entry in a 3-tuple $<h(v), f_{eS}(h(v)), f_{e'S}(h(v))>$ from Step 6. Using the third entry $f_{e'S}(h(v)) = \kappa(v)$ as the key, R decrypts $K(f_{e'S}(h(v)), \text{ext}(v))$ and gets ext(v). The corresponding v's form the intersection $V_S \cap V_R$.

8. R uses ext(v) for $v \in V_S \cap V_R$ to compute $T_S \bowtie T_R$.

4.4 Proofs of Correctness and Security

STATEMENT 3. Assuming there are no hash collisions, S learns $|V_R|$, and R learns $|V_S|$, $V_S \cap V_R$, and ext(v) for all $v \in V_S \cap V_R$.

PROOF. This protocol is an extension of the intersection protocol, so it allows R to determine $V_S \cap V_R$ correctly. Since R learns the keys $\kappa(v)$ for values in the intersection, R also gets ext(v) for the keys x(v) for values in the intersection, R also gets ext(v) for $v \in V_S \cap V_R$.

Next we prove that R and S do not learn anything besides the above. We first extend Lemma 2 as follows.

LEMMA 3. For polynomial n, the distributions of the following two 3×n-tuples $$\begin{pmatrix} x_1 & \ldots & x_n \\ f_e(x_1) & \ldots & f_e(x_n) \\ f_{e'}(x_1) & \ldots & f_{e'}(x_n) \end{pmatrix} \text{ and } \begin{pmatrix} x_1 & \ldots & x_n \\ y_1 & \ldots & y_n \\ z_1 & \ldots & z_n \end{pmatrix}$$

are computationally indistinguishable, where $\forall i: x_i, y_i, z_i \in \text{DomF}$, and $e, e' \in \text{KeyF}$ PROOF. Let us denote the left distribution by $D_1$, the right distribution by $D_2$, and the following "intermediate" distribution by $D_3$:

$$\begin{pmatrix} x_1 & \ldots & x_n \\ f_e(x_1) & \ldots & f_e(x_n) \\ z_1 & \ldots & z_n \end{pmatrix}$$

The first and third line in the tuples for $D_1$ and $D_3$ are distributed like $D''_n$ and $D''_0$ (from Lemma 2) respectively. The second line in both $D_1$ and $D_3$ can be obtained from the first line by applying $f_e$ with random key e. Therefore, since $D''_n$ and $D''_0$ are indistinguishable by Lemma 2, distributions $D_1$ and $D_3$ are also indistinguishable.

Analogously, the first and second lines in $D_3$ and $D_2$ are distributed like $D''_0$ and $D''_n$ respectively. The third line in both $D_3$ and $D_2$ can be obtained by using random numbers for the $z_i$'s. Therefore, by Lemma 2, $D_3$ and $D_2$ are also indistinguishable.

Finally, since both $D_1$ and $D_2$ are indistinguishable from $D_3$, they themselves are indistinguishable.

The following lemma will be used in the proof for the security of the join protocol to show that the real and simulated views for R are indistinguishable. $D'_1$ corresponds to the real view (for R), while $D'_2$ corresponds to the simulated view. The first t columns correspond to $V_S-(V_S \cap V_R)$, the next m-t columns to $V_S \cap V_R$, and the last n-m columns to $V_R-(V_S \cap V_R)$.

LEMMA 4. For polynomial m, t, and n, and any $c_i \in V_{ext}$, the two distributions $D'_1$ and $D'_2$ of the 4×n-tuple $$\begin{pmatrix} x_1 & \ldots & x_t & x_{t+1} & \ldots & x_m & x_{m+1} & \ldots & x_n \\ y_1 & \ldots & y_t & y_{t+1} & \ldots & y_m & y_{m+1} & \ldots & y_n \\ & & & z_{t+1} & \ldots & z_m & z_{m+1} & \ldots & z_n \\ \xi_1 & \ldots & \xi_t & \xi_{t+1} & \ldots & \xi_m & & & \end{pmatrix}$$

such that for $D'_1$, $\forall i: x_i \in \text{DomF}$, $y_i=f_e(x_i)$, $z_i=f_{e'}(x_i)$, and $\xi i=K(f_{e'}(x_i),c_i)$ where $e, e' \in \text{KeiF}$;

for $D'_2$, $\forall i: x_i, y_i, z_i \in \text{DomF}$, and i=1 ... t: $\xi i$ is independent random with distribution $D_{ext}$, i=t+1 ... m: $\xi i=K(z_i, c_i)$ are computationally indistinguishable. (In both $D'_1$ and $D'_2$, the positions corresponding to $z_1 \ldots z_t$ and $\xi_{m+1} \ldots \xi_n$ are blank.

PROOF. Denote by $D'_3$ the following "intermediate" distribution:

$\forall i: x_i, y_i, z_i \in \text{DomF}$ and $\xi i=K(z_i, c_i)$.

Note that the $z_i$ for i=1 ... t are not included in the tuple, even though they are used to generate $K(z_i, c_i)$.

The only difference between the two distributions $D'_2$ and $D'_3$ is that, for i=1 ... t, we replace $\xi i$ distributed as $D_{ext}$ with $K(z_i, c_i)$ where $z_i \in \text{DomF}$; the rest of the matrix is independent and stays the same. Since $z_i$ is not a part of the matrix for i=1 ... t, by Property 2 of encryption $K(\kappa,c)$, distributions $D'_2$ and $D'_3$ are indistinguishable.

Next we use Lemma 3 to show that distributions $D'_1$ and $D'_3$ are also indistinguishable. We define function Q(M) that takes a 3×n matrix M (from Lemma 3) and generates a 4×n matrix M' as follows:

1. The first 3 rows of M' are the same as the first 3 rows of M, except that the values corresponding to $z_1, \ldots, z_t$ in M' are left blank.

2. The fourth row of M' is generated by taking $\xi i=K(z_i, c_i)$ where $z_i$ is the corresponding value of the third row of M.

If M is distributed like $D_1$ of Lemma 3, Q(M) corresponds to $D'_1$. If M is distributed like $D_2$, Q(M) corresponds to $D'_3$. Since by Lemma 3, $D_1$ and $D_2$ are indistinguishable, and Q(M) is computable in polynomial time, $D'_1$ and $D'_3$ are also indistinguishable.

Finally, since both $D'_1$ and $D'_2$ are indistinguishable from $D'_3$, they themselves are indistinguishable.

STATEMENT 4. The join protocol is secure if both parties are semi-honest. At the end of the protocol, S learns only $|V_R|$; R learns only $|V_S|$, $V_S \cap V_R$, and ext(v) for all $v \in V_S \cap V$.

PROOF. As in the proof of Statement 2, we will construct simulators of each party's view of the protocol, such that each simulator is given only what the party is supposed to learn, and such that the distribution of the real view is indistinguishable from the distribution of the simulated view.

The simulator for S is identical to that in Statement 2, since S gets exactly the same input from R as in the intersection protocol. Hence the proof from Statement 2 directly applies.

The simulator for R (that simulates what R receives from S) can use h, er, $V_R$, $V_S \cap V_R$, ext(v) for $v \in V_S \cap V_R$, and $|V_S|$. Let $$V_S=\{v_1, \ldots, v_t, v_{t+1}, \ldots, v_m\} \text{ and}$$

$$V_R=\{v_{t+1}, \ldots, v_m, v_{m+1}, \ldots, v_n\}.$$

So $t=|V_S-V_R|$, $m=|V_S|$, and $n=|V_S \cup V_R|$. Note that the simulator does not know the values in $V_S-V_R$.

In Step 4, the simulator generates n random numbers $y_i$, $\in \text{DomF}$, i=1 ... n as the simulated values for $f_{eS}(h(v_i))$, and an additional n random numbers $z_i \in \text{DomF}$ as the simulated values for $f_{e'S}(h(v_i))$. The simulation then uses key $e_R$ to create $$\langle f_{eR}(h(v_i)), f_{eR}(y_i), f_{eR}(z_i) \rangle$$

for i=t+1 ... m. These triplets are ordered lexicographically and comprise the simulated view for Step 4.

In Step 5, the simulator creates the pairs as follows:

For values $v_{i+1}, \ldots, v_m$ from $V_S \cap V_R$, the simulator encrypts ext($v_i$) as $\xi i=K(z_i, \text{ext}(v_i))$; then it forms pairs $\langle y_i, \xi i \rangle$;

For i=1 . . . t, the simulator creates $|V_S-V_R|$ additional pairs $<y_i, \xi i>$ where $\xi i$ have distribution $D_{ext}$ over $C_{ext}$, i.e. $y_i$ and $\xi i$ are random values from their respective domains.

These pairs are sorted lexicographically and comprise the simulated view for Step 5.

Setting $x_i=h(v_i)$, the real view corresponds to distribution $D'_1$ of the matrix in Lemma 4, while the simulation corresponds to distribution $D'_2$ of the matrix. The only difference is that some variables appear in the view encrypted by $f_{eR}$, which makes the view an efficiently-computable function of the matrix. Since these $D'_1$ and $D'_2$ are indistinguishable, the simulation is also indistinguishable from the real view.

5. Intersection and Join Sizes

5.1 Intersection Size

We now show how the intersection protocol can be modified, such that R only learns the intersection size, but not which values in $V_R$ were present in $V_S$. (Simply applying the intersection protocol would reveal the set $V_R \cap V_S$, in addition to the intersection size.) Recall that in Step 4 of the intersection protocol, S sends back to R the values of $y \in Y_R$ together with their encryptions made by S. These encryptions are paired with the unencrypted y's so that R can match the encryptions with R's values. If instead S sends back to R only the lexicographically reordered encryptions of the y's and not the y's themselves, R can no longer do the matching.

5.1.1 Intersection Size Protocol

We now present the protocol for intersection size. (Steps 1 through 3 are the same as in the intersection protocol.)

1. Both S and R apply hash function h to their sets:

$$X_S=h(V_S) \text{ and } X_R=h(V_R).$$

Each party randomly chooses a secret key:

$$e_S \in r \text{ KeyF for S and } e_R \in r \text{ KeyF for R}.$$

2. Both parties encrypt their hashed sets:

$$Y_S=f_{eS}(X_S)=f_{eS}(h(V_S)) \text{ and}$$

$$Y_R=f_{eR}(X_R)=f_{eR}(h(V_R)).$$

3. R sends to S its encrypted set $Y_R=f_{eR}(h(V_R))$, reordered lexicographically.

4. (a) S ships to R its set $Y_S=f_{eS}(h(V_S))$, reordered lexicographically.
   (b) S encrypts each $y \in Y_R$ with S's key $e_S$ and sends back to R the set $Z_R=f_{eS}(Y_R)=f_{eS}(f_{eR}(h(V_R)))$, reordered lexicographically.

5. R encrypts each $y \in Y_S$ with $e_R$, obtaining $Z_S=f_{eR}(f_{eS}(h(V_S)))$.

6. Finally, R computes intersection size $|Z_S \cap Z_R|$, which equals $|V_S \cap V_R|$.

5.1.2 Proofs of Correctness and Security

STATEMENT 5. Assuming there are no hash collisions, S learns the size $|V_R|$ and R learns the size $|V_S|$ and the size $|V_S \cap V_R|$.

PROOF. The proof is very similar to that for Statement 1. Since $f_{eS}$ and $f_{eR}$ commute and are bijective, assuming that hash function h has no collisions on $V_S \cup V_R$, $|V_S \cap V_R|=|f_{eR}(f_{eS}(h(V_S))) \cap f_{eS}(f_{eR}(h(V_R)))|$. Therefore, recovers the correct size $|V_S \cap V_R|$.

STATEMENT 6. The intersection size protocol is secure if both parties are semi-honest. At the end of the protocol, S learns only the size $|V_R|$, and R learns only the sizes $|V_S|$ and $|V_S \cap V_R|$.

PROOF. We use the same methodology as in the proofs of Statement 2 and 4.

The simulator for S's view of the intersection size protocol is identical to that in Statement 2, since S gets exactly the same input from R as in the intersection protocol. Hence the proof from Statement 2 directly applies.

The simulator for R's view of the protocol is allowed to use $V_R$, the hash function h, $e_R$, and the numbers $|V_S \cap V_R|$ and $|V_S|$; however, it has neither $V_S-V_R$ nor $V_S \cap V_R$. Let $$V_S=\{v_1, \ldots, v_t, v_{t+1}, \ldots, v_m\} \text{ and}$$

$$V_R=\{v_{t+1}, \ldots, v_m, v_{m+1}, \ldots, v_n\}.$$

So $t=|V_S-V_R|$, $m=|V_S|$, and $n=|V_S \cup V_R|$.

The simulator generates n random numbers $y_1, \ldots, y_n \in r$ DomF which play the role of $f_{eS}(h(v))$ for all $v \in V_S \cup V_R$. The key $e_S$ is not simulated, and no decision is made about which $y_i$ stands for which $e_S(h(v))$. In Step 4(a), the simulation creates $Y_S$ as $Y_S=\{y1, \ldots, ym\}$.

In Step 4(b), the simulation generates $Z_R$ by taking set $\{y_{t+1}, \ldots, y_n\}$ and encoding it with $f_{eR}$:

$$Z_R=\{f_{eR}(y_{t+1}), \ldots, f_{eR}(yn)\}.$$

We now show that the distribution of R's real view in the protocol is computationally indistinguishable from the distribution of R's simulated view.

According to Lemma 2, the distributions $D''_0$ and $D''_n$ of the following matrix M:

$$\begin{pmatrix} x_1 & \ldots & x_n \\ y_1 & \ldots & y_n \end{pmatrix}$$

where $D''_0: \forall i: x_i, y_i \in r \text{ DomF};$ $D''_n: \forall i: x_i \in r \text{ DomF}, y_i=f_{eS}(x_i), e_S \in r \text{ KeyF};$ are indistinguishable. Given $x_i=h(v_i)$, consider the following function Q(M):

$$Q(M)=<h,e_R,Y_S,Z_R>,$$

where h:= a function on $V_S \cup V_R$ such that $xi:h(v_i)=x_i$;

$e_R$:= a random key;

$Y_S:=\{y1, \ldots, ym\}$;

$Z_R:=\{f_{eR}(y_{t+1}), \ldots, f_{eR}(yn)\}$.

If M is distributed according to $D''_0$, then Q(M) corresponds to the simulated view of server R. If M's distribution is $D''_n$, then $$y_i=f_{eS}(x_i)=f_{eS}(h(v_i)),$$

$$f_{eR}(y_i)=f_{eR}(f_{eS}(x_i))=f_{eS}(f_{eR}(h(v_i))),$$

and Q(M) is distributed like the real view of R. Since from Lemma 2, $D''_0$ and $D''_n$ are indistinguishable, and Q is computable in polynomial time, the simulated view $Q(D''_0)$ and the real view $Q(D''_n)$ are also indistinguishable.

5.2 Equijoin Size

To evaluate equijoin size, we follow the intersection size protocol, except that we allow $V_R$ and $V_S$ to be multi-sets, i.e., contain duplicates, and then compute the join size instead of the intersection size in Step 6. However, R can now use the number of duplicates of a given value to partially match values in $Y_R$ with their corresponding encryptions in $Z_R$. We now characterize exactly what R and S learn in this protocol (besides $|V_R|$, $|V_S|$ and $|V_R \bowtie V_S|$).

To start with, R learns the distribution of duplicates in $V_S$, and S learns the distribution of duplicates in $V_R$. To characterize what else R learns, let us partition the values in $V_R$ based on the number of duplicates, i.e., in a partition $V_R(d)$, each $v \in V_R(d)$ has d duplicates. Then, for each partition, R learns $|V_R(d) \sqcap V_S(d')|$ for each partition $V_S(d')$ of $V_S$. Thus if all values have the same number of duplicates (e.g., no duplicates as in our intersection protocol), R only learns $|V_R \sqcap V_S|$. At the other extreme, if no two values have the same number of duplicates, R will learn $V_R \sqcap V_S$.

6. Cost Analysis 6.1 Protocols

Let each encrypted codeword (in DomF) be k bits long, $C_h$ denote the cost of evaluating the hash function $C_e$ denote the cost of encryption/decryption by F (e.g., exponentiation "$x^y$ mod p" over k-bit integers), $C_K$ denote the cost of encryption/decryption by K (e.g., encoding/decoding as a quadratic residue and multiplication), and n (log n) $C_S$ be the cost of sorting a set of n encryptions.

We assume the obvious optimizations when computing the computation and communication costs. For example, in the join protocol, we assume that the protocol does not decrypt y to h(v) in Step 6 but uses order preservation for matching. Also, in all the protocols, S does not retransmit y's back but just preserves the original order.

Computation The computation costs are:

Intersection: $(C_h + 2C_e)(|V_S| + |V_R|) + 2C_S|V_S|\log|V_S| + 3C_S|V_R|\log|V_R|$ Join: $C_h(|V_S| + |V_R|) + 2C_e|V_S| + 5C_e|V_R| + Ck(|V_S| + |V_S \sqcap V_R|) + 2C_S|V_S|\log|V_S| + 3C_S|V_R|\log|V_R|$ We can assume $C_e \gg C_h$, $C_e \gg Ck$, and $nC_e \gg n(\log n) C_S$, so these formulae can be approximated by:

Intersection: $2C_e(|V_S| + |V_R|)$

Join: $2C_e|V_S| + 5C_e|V_R|$

Communication The communication cost is:

Intersection: $(|V_S| + 2|V_R|)k$ bits

Join: $(|V_S| + 3|V_R|)k + |V_S|k'$ bits, where k' is the size of the encrypted ext(v).

Both the intersection size and join size protocols have the same computation and communication complexity as the intersection protocol.

6.2 Applications

We now estimate the execution times for the applications in Section 1.1.

For the cost of $C_e$ (i.e., cost of $x^y$ mod p), we use the times from [36]: 0.02 s for 1024-bit numbers on a Pentium III (in 2001). This corresponds to around $2 \times 10^5$ exponentiations per hour. We assume that communication is via a T1 line, with bandwidth of 1.544 Mbits/second ($\times 5$ Gbits/hour).

Encrypting the set of values is trivially parallelizable in all three protocols. We assume that we have P processors that we can utilize in parallel: we will use a default value of P=10.

6.2.1 Selective Document Sharing

Recall that we have two databases $D_R$ and $D_S$, where each database contains a set of documents, and a document consists of a set of significant words. We wish to find all pairs of documents $d_R \in D_R$ and $d_S \in D_S$ such that, for some similarity function f and threshold $\tau$, $f(|d_R \sqcap d_S|, |d_R|, |d_S|) > \tau$. For example, f could be $|d_R \sqcap d_S|/(|d_R| + |d_S|)$.

Implementation R and S execute the intersection size protocol for each pair of documents $d_R \in D_R$ and $d_S \in D_S$ to get $|d_R \sqcap d_S|$, $|d_R|$ and $|d_S|$; they then compute the similarity function f.

For S, in addition to the number of documents $|D_S|$, this protocol also reveals to R for each document $d_R \in D_R$, which documents in $D_S$ matched $d_R$, and the size of $|d_R \sqcap d_S|$ for each document $d_S \in D_S$.

Cost Analysis For a given pair of documents $d_R$ and $d_S$, the computation time is $(|d_R| + |d_S|)2C_e$, and the data transferred is $(|d_R| + 2|d_S|)k$ bits. Thus the total cost is:

Computation: $|D_R||D_S|(|d_R| + |d_S|)2C_e$

Communication: $|D_R||D_S|(|d_R| + 2|d_S|)k$

If $|D_R|=10$ documents, $D_S=100$ documents, and $|d_R|=|d_S|=1000$ words, the computation time will be $4 \times 10^6$ $C_e/P \approx 2$ hours. The data transferred will be $3 \times 10^6$ k $\approx 3$ Gbits $\approx 35$ minutes.

6.2.2 Medical Research

Recall that we wish to get the answer to the query select pattern, reaction, count(*)

from $T_R$, $T_S$ where $T_R$.id=$T_S$.id and $T_S$.drug=true group by $T_R$.pattern, $T_S$.reaction where $T_R$ and $T_S$ are tables in two different enterprises.

Figure 2:
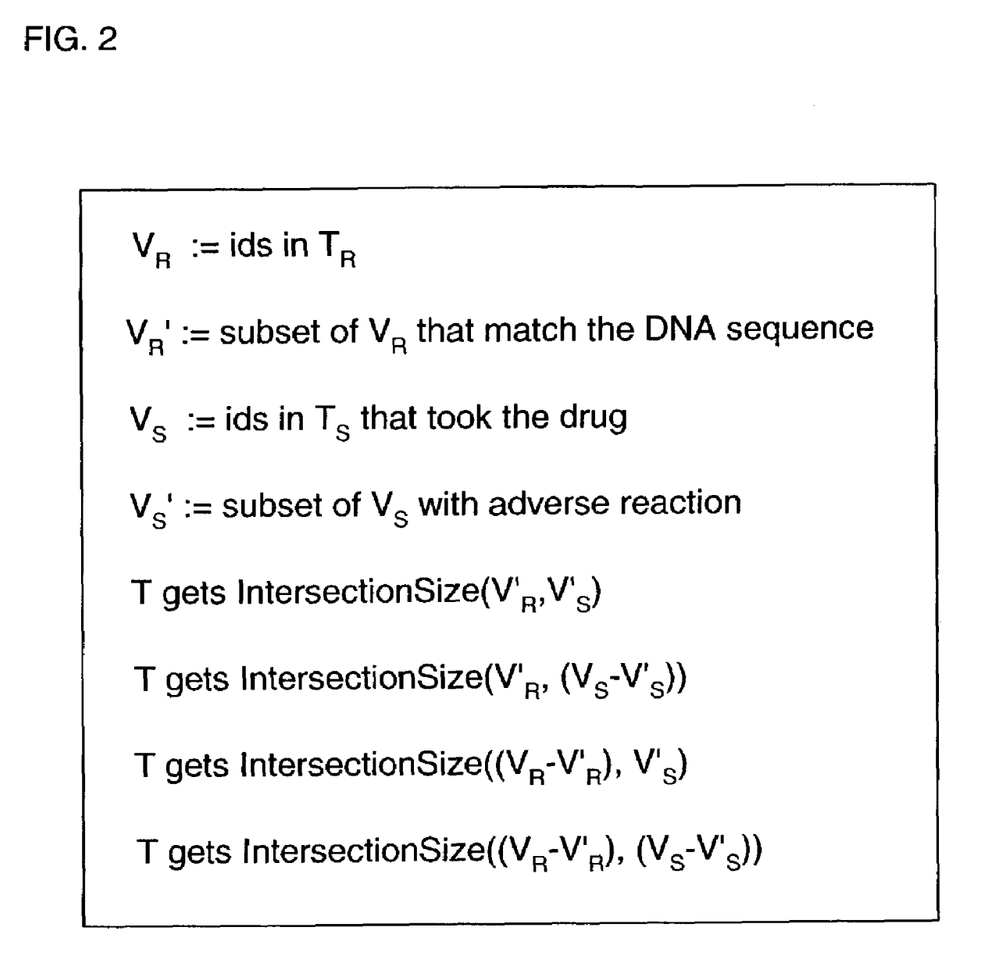
FIG. 2 shows an application of a system for information integration with minimal sharing for a medical research application.

Implementation FIG. 2 shows the implementation algorithm. We use a slightly modified version of the intersection size protocol where $Z_R$ and $Z_S$ are sent to T, the researcher, instead of to S and R. Note that whenever we have, say, $(V_R - V_R')$ inside IntersectionSize, the set difference is computed locally, and the result is the input to the protocol.

Cost Analysis The combined cost of the four intersections is $2(|V_R| + |V_S|)2C_e$, and the data transferred is $2(|V_R| + |V_S|)2$ k bits. If $|V_R|=|V_S|=1$ million, the total computation time will be $8 \times 10^6$ $C_e/P \approx 4$ hours. The total communication time will be $8 \times 10^6$ k $\approx 8$ Gbits $\approx 1.5$ hours.

A general purpose computer is programmed according to the inventive steps herein.

The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular scheme for INFORMATION INTEGRATION ACROSS AUTONOMOUS ENTERPRISES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

REFERENCES

[1] N. R. Adam and J. C. Wortman. Security-control methods for statistical databases. ACM Computing Surveys, 21(4):515-556, December 1989.

[2] R. Agrawal and J. Kiernan. Watermarking relational databases. In 28th Int'l Conference on Very Large Databases, Hong Kong, China, August 2002.

[3] R. Agrawal, J. Kiernan, R. Srikant, and Y. Xu. Hippocratic databases. In Proc. of the 28th Int'l Conference on Very Large Databases, Hong Kong, China, August 2002.

[4] R. Agrawal, J. Kiernan, R. Srikant, and Y. Xu. Implementing P3P using database technology. In Proc. of the 19th Int'l Conference on Data Engineering, Bangalore, India, March 2003.

[5] R. Agrawal, J. Kiernan, R. Srikant, and Y. Xu. An XPath-based preference language for P3P. In Proc. of the 12th Int'l World Wide Web Conference, Budapest, Hungary, May 2003.

[6] R. Agrawal and R. Srikant. Privacy preserving data mining. In ACM SIGMOD Conference on Management of Data, pages 439-450, Dallas, Tex., May 2000.

[7] S. Ajmani, R. Morris, and B. Liskov. A trusted third-party computation service. Technical Report MIT-LCS-TR-847, MIT, May 2001.

[8] M. Bellare and P. Rogaway. Random oracles are practical: A paradigm for designing efficient protocols. In Proc. of the First ACM Conf. on Computer and Communications Security, pages 62-73, Fairfax, Va., 1993.

[9] J. C. Benaloh and M. de Mare. One-way accumulators: A decentralized alternative to digital signatures. In Advances in Cryptology—EUROCRYPT'93, Workshop on the Theory and Application of Cryptographic Techniques, volume 765 of Lecture Notes in Computer Science, pages 274-285, Lofthus, Norway, May 1993. Springer-Verlag.

[10] D. Boneh. The decision diffie-hellman problem. In Proc. of the 3rd International Algorithmic Number Theory Symposium, volume 1423 of Lecture Notes in Computer Science, pages 48-63, Portland, Oreg., USA, June 1998. Springer-Verlag.

[11] C. Cachin, S. Micali, and M. Stadler. Computationally private information retrieval with polylogarithmic communication. In Theory and Application of Cryptographic Techniques, pages 402-414, 1999.

[12] S. Chawathe, H. Garcia-Molina, J. Hammer, K. Ireland, Y. Papakonstantinou, J. Ullman, and J. Widom. The TSIMMIS project: Integration of heterogeneous information sources. In 16th Meeting of the Information Processing Society of Japan, pages 7-18, Tokyo, Japan, 1994.

[13] F. Chin and G. Ozsoyoglu. Auditing and inference control in statistical databases. IEEE Transactions on Software Eng., SE-8(6):113-139, April 1982.

[14] B. Chor and N. Gilboa. Computationally private information retrieval. In Proc. of 29th ACM Symposium on Theory of Computing, pages 304-313, 1997.

[15] B. Chor, O. Goldreich, E. Kushilevitz, and M. Sudan. Private information retrieval. In IEEE Symposium on Foundations of Computer Science, pages 41-50, 1995.

[16] U. Dayal and H.-Y. Hwang. View definition and generalization for database integration in a multidatabase system. IEEE Transactions on Software Eng., 10(6):628-645, 1984.

[17] D. Denning, P. Denning, and M. Schwartz. The tracker: A threat to statistical database security. ACM Transactions on Database Systems, 4(1):76-96, March 1979.

[18] W. Diffie and M. Hellman. New directions in cryptography. IEEE Transactions on Information Theory, IT-22(6):644-654, November 1976.

[19] D. Dobkin, A. Jones, and R. Lipton. Secure databases: Protection against user influence. ACM Transactions on Database Systems, 4(1):97-106, March 1979.

[20] T. ElGamal. A public key cryptosystem and a signature scheme based on discrete logarithms. IEEE Transactions on Information Theory, IT-31(4):469-472, July 1985.

[21] A. Elmagarmid, M. Rusinkiewicz, and A. Sheth, editors. Management of Heterogeneous & Autonomous Database Systems. Morgan Kaufmann, 1999.

[22] A. Evfimievski, R. Srikant, R. Agrawal, and J. Gehrke. Privacy preserving mining of association rules. In Proc. of the 8th ACM SIGKDD Int'l Conference on Knowledge Discovery and Data Mining, Edmonton, Canada, July 2002.

[23] I. Fellegi. On the question of statistical confidentiality. Journal of the American Statistical Assoc., 67(337):7-18, March 1972.

[24] A. Fiat and A. Shamir. How to prove yourself: Practical solutions to identification and signature problems. In A. M. Odlyzko, editor, Advances in Cryptology, Proceedings of Crypto 86, volume 263 of Lecture Notes in Computer Science, pages 186-194. Springer-Verlag, 1987.

[25] Y. Gertner, Y. Ishai, E. Kushilevitz, and T. Malkin. Protecting data privacy in private information retrieval schemes. In ACM Symposium on Theory of Computing, pages 151-160, 1998.

[26] O. Goldreich. Secure multi-party computation. Working Draft, Version 1.3, June 2001.

[27] L. M. Haas, R. J. Miller, B. Niswonger, M. T. Roth, P. M. Schwarz, and E. L. Wimmers. Transforming heterogeneous data with database middleware: Beyond integration. IEEE Data Engineering Bulletin, 22(1), 1999.

[28] B. A. Huberman, M. Franklin, and T. Hogg. Enhancing privacy and trust in electronic communities. In Proc. of the 1st ACM Conference on Electronic Commerce, pages 78-86, Denver, Colo., November 1999.

[29] P. Ipeirotis and L. Gravano. Distributed search over the hidden web: Hierarchical database sampling and selection. In 28th Int'l Conference on Very Large Databases, Hong Kong, China, August 2002.

[30] N. Jefferies, C. Mitchell, and M. Walker. A proposed architecture for trusted third party services. In Cryptography Policy and Algorithms Conference. Springer LNCS v 1029 pp 98-104, July 1995.

[31] M. Kantarcioglu and C. Clifton. Privacy-preserving distributed mining of association rules on horizontally partitioned data. In ACM SIGMOD Workshop on Research Issues on Data Mining and Knowledge Discovery, June 2002.

[32] E. Kushilevitz and R. Ostrovsky. Replication is not needed: Single database, computationally-private information retrieval. In Proc. of the IEEE Symp. on Found. of Computer Science (FOCS), 1997.

[33] Y. Lindell and B. Pinkas. Privacy preserving data mining. Journal of Cryptology, 15(3):177-206, 2002.

[34] M. Naor and K. Nissim. Communication preserving protocols for secure function evaluation. In Proc. of the ACM Symposium on Theory of Computing, pages 590-599, 2001.

[35] M. Naor and B. Pinkas. Oblivious transfer and polynomial evaluation. In Proc. of the 31th ACM Symposium on Theory of Computing, pages 245-254, Atlanta, Ga., 1999.

[36] M. Naor and B. Pinkas. Efficient oblivious transfer protocols. In Proc. of the 12th Annual ACM-SIAM Symposium on Discrete Algorithms, pages 448-457, Washington D.C., USA, January 2001.

[37] M. Naor, B. Pinkas, and R. Sumner. Privacy preserving auctions and mechanism design. In Proc. of the 1st ACM Conference on Electronic Commerce, pages 129-139, Denver, Colo., November 1999.

[38] B. Preneel. Analysis and design of cryptographic hash functions. Ph.D. dissertation, Katholieke Universiteit Leuven, 1992.

[39] M. O. Rabin. How to exchange secrets by oblivious transfer. Technical Memo TR-81, Aiken Computation Laboratory, Harvard University, 1981.

[40] S. J. Rizvi and J. R. Haritsa. Privacy-preserving association rule mining. In Proc. of the 28th Int'l Conference on Very Large Databases, August 2002.

[41] G. Salton and M. McGill. Introduction to Modern Information Retrieval. McGraw-Hill, New York, 1983.

[42] A. Shamir, R. L. Rivest, and L. M. Adleman. Mental poker. Technical Memo MIT-LCS-TM-125, Laboratory for Computer Science, MIT, February 1979.

[43] C. E. Shannon. Communication theory of secrecy systems. Bell System Technical Journal, 28-4:656-715, 1949.

[44] A. Shoshani. Statistical databases: Characteristics, problems and some solutions. In Proc. of the Eighth Int'l Conference on Very Large Databases, pages 208-213, Mexico City, Mexico, September 1982.

[45] S. W. Smith and D. Safford. Practical private information retrieval with secure coprocessors. Research Report RC 21806, IBM, July 2000.

[46] D. R. Stinson. Cryptography: Theory and Practice, chapter 4. Chapman & Hall/CRC, second edition, 2002.

[47] J. Vaidya and C. W. Clifton. Privacy preserving association rule mining in vertically partitioned data. In Proc. of the 8th ACM SIGKDD Int'l Conference on Knowledge Discovery and Data Mining, Edmonton, Canada, July 2002.

[48] G. Wiederhold. Intelligent integration of information. In Proc. of the ACM SIGMOD Conf. on Management of Data, Washington, D.C., 1993.

[49] A. C. Yao. How to generate and exchange secrets. In Proc. of the 27th Annual Symposium on Foundations of Computer Science, pages 162-167, Toronto, Canada, October 1986.

We claim:

1. A computer-implemented method for processing an intersection type query spanning separate databases while revealing only minimal information beyond a query answer, comprising:

(a) sender S and receiver R each apply a hash function h to their respective attribute value sets, $X_S=h(V_S)$ and $X_R=h(V_R)$;

(b) sender S and receiver R each choose a random secret key, $e_S \in KeyF$ for S and $e_R \in KeyF$ for R;

(c) sender S and receiver R each encrypt their respective hashed sets, $Y_S=f_{eS}(X_S)=f_{eS}(h(V_S))$ and $Y_R=f_{eR}(X_R)=f_{eR}(h)(V_R))$;

(d) receiver R sends to sender S its encrypted set $Y_R=f_{eR}(h(V_R))$, reordered lexicographically;

(e) sender S sends to receiver R its set $Y_S=f_{eS}(h(V_S))$, reordered lexicographically;

(f) sender S encrypts each $y \in Y_R$ with key $e_S$ and sends back to R pairs $<y, f_{eS}(y)>=<f_{eR}(h(v)), f_{eS}(f_{eR}(h(v)))>$;

(g) receiver R encrypts each $y \in Y_S$ with $e_R$, obtaining $Z_S=f_{eR}(f_{eS}(h(V_S)))$ and from pairs $<f_{eR}(h(v)), f_{eS}(f_{eR}(h(v)))>$ obtained in Step (f) for $v \in V_R$, receiver R creates pairs $<v, f_{eS}(f_{eR}(h(v)))>$ by replacing $f_{eR}(h(v))$ with the corresponding v; and (h) receiver R selects all $V \in V_R$ for which $(f_{eS}(f_{eR}(h(v)))) \in Z_S$ to form $V_S \cap V_R$.

2. A computer-implemented method for processing an equijoin type query spanning separate databases while revealing only minimal information beyond a query answer, comprising:

(a) sender S and receiver R each apply a hash function h to their respective attribute value sets, $X_S=h(V_S)$ and $X_R=h(V_R)$;

(b) receiver R chooses a secret key $e_R \in KeyF$ and sender S chooses two secret keys $e_S$, $e'_S \in KeyF$;

(c) receiver R encrypts its hashed set $Y_R=f_{eR}(X_R)=f_{eR}(h(V_R))$;

(d) receiver R sends its encrypted set $Y_R$ to sender S, reordered lexicographically;

(e) sender S encrypts each $y \in Y_R$ with both key $e_S$ and key $e'_S$, and sends back to R 3-tuples $<y, f_{eS}(Y), f_{e'S}(Y)>=<f_{eR}(h(v)), f_{eS}(f_{eR}(h(v))), f_{e'S}(f_{eR}(h(v)))>$;

(f) for each $v \in V_S$, sender S:

(g) encrypts the hash h(v) with $e_S$, obtaining $f_{eS}(h(v))$;

(h) generates key $\kappa(v)=f_{e'S}(h(v))$ for extra information ext(v) using $e'_S$;

(i) encrypts said extra information $c(v)=K(\kappa(v), ext(v))$;

(j) forms a pair $<f_{eS}(h(v)), c(v)>=<f_{eS}(h(v)), K(f_{e'S}(h(v)), ext(v))>$;

(k) ships said pair to receiver R in lexicographical order;

(l) receiver R applies $f^1_{eR}$ to all entries in the 3-tuples received at step (e), obtaining $<h(v), f_{eS}(h(v)), f_{e'S}(h(v))>$ for all $v \in V_R$;

(m) receiver R sets aside all pairs <$f_{eS}(h(v))$, $K(f_{e'S}(h(v))$, ext(v))> received at step (f) when a first entry occurs as a second entry in a 3-tuple <h(v), $f_{eS}(h(v))$, $f_{e'S}(h(v))$> from step (l);

(n) receiver R decrypts $K(f_{e'S}(h(v))$, ext(v)) and gets ext(v) using the third entry $f_{e'S}(h(v))=\kappa(v)$ as the key, so that the corresponding v's form the intersection $V_S \cap V_R$; and (o) receiver R uses ext(v) for $v \in V_S \cap V_R$ to compute $T_S \bowtie T_R$.

3. A computer-implemented method for processing an intersection size type query spanning separate databases while revealing only minimal information beyond a query answer, comprising:

(a) sender S and receiver R each apply a hash function h to their respective attribute value sets, $X_S = h(V_S)$ and $X_R = h(V_R)$;

(b) sender S and receiver R each choose a random secret key, es $\in$ KeyF for S and er $\in$ KeyF for R;

(c) sender S and receiver R each encrypt their respective hashed sets, $Y_S = f_{eS}(X_S) = f_{eS}(h(V_S))$ and $Y_R = f_{eR}(X_R) = f_{eR}(h)(V_R))$;

(d) receiver R sends to sender S its encrypted set $Y_R = f_{eR}(h(V_R))$, reordered lexicographically;

(e) sender S sends its set $Y_S = f_{eS}(h(V_S))$ to receiver R, reordered lexicographically;

(f) sender S encrypts each $y \in Y_R$ with S's key $e_S$ and sends back to R the set $Z_R = f_{eS}(Y_R) = f_{eS}(f_{eR}(h(V_R)))$, reordered lexicographically;

(g) receiver R encrypts each $y \in Y_S$ with $e_R$, obtaining $Z_S = f_{eR}(f_{eS}(h(V_S)))$, and (h) receiver R computes intersection size $|Z_S \cap Z_R|$, which equals $|V_S \cap V_R|$.

4. A computer-implemented method for processing an equijoin size type query spanning separate databases while revealing only minimal information beyond a query answer, comprising:

(a) sender S and receiver R each apply a hash function h to their respective attribute value sets, $X_S = h(V_S)$ and $X_R = h(V_R)$;

(b) sender S and receiver R each choose a random secret key, es $\in$ KeyF for S and er $\in$ KeyF for R;

(c) sender S and receiver R each encrypt their respective hashed sets, $Y_S = f_{eS}(X_S) = f_{eS}(h(V_S))$ and $Y_R = f_{eR}(X_R) = f_{eR}(h)(V_R))$;

(d) receiver R sends to sender S its encrypted set $Y_R = f_{eR}(h(V_R))$, reordered lexicographically;

(e) sender S sends its set $Y_S = f_{eS}(h(V_S))$ to receiver R, reordered lexicographically;

(f) sender S encrypts each $y \in Y_R$ with S's key $e_S$ and sends back to R the set $Z_R = f_{eS}(Y_R) = f_{eS}(f_{eR}(h(V_R)))$, reordered lexicographically;

(g) receiver R encrypts each $y \in Y_S$ with $e_R$, obtaining $Z_S = f_{eR}(f_{eS}(h(V_S)))$, and (h) receiver R computes join size $|V_R \bowtie V_S|$, wherein $V_R$ and $V_S$ may contain duplicates.

5. A general purpose computer system programmed with instructions for processing an intersection type query spanning separate databases while revealing only minimal information beyond a query answer, the instructions comprising:

(a) sender S and receiver R each apply a hash function h to their respective attribute value sets, $X_S = h(V_S)$ and $X_R = h(V_R)$;

(b) sender S and receiver R each choose a random secret key, es $\in$ KeyF for S and er $\in$ KeyF for R;

(c) sender S and receiver R each encrypt their respective hashed sets, $Y_S = f_{eS}(X_S) = f_{eS}(h(V_S))$ and $Y_R = f_{eR}(X_R) = f_{eR}(h)(V_R))$;

(d) receiver R sends to sender S its encrypted set $Y_R = f_{eR}(h(V_R))$, reordered lexicographically;

(e) sender S sends to receiver R its set $Y_S = f_{eS}(h(V_S))$, reordered lexicographically;

(f) sender S encrypts each $y \in Y_R$ with key $e_S$ and sends back to R pairs <y,$f_{eS}(Y)$>=<$f_{eR}(h(v))$,$f_{eS}(f_{eR}(h(v)))$>;

(g) receiver R encrypts each y $\in$ Ys with er, obtaining $Z_S = f_{eR}(f_{eS}(h(V_S)))$ and from pairs <$f_{eR}(h(v))$,$f_{eS}(f_{eR}(h(v)))$> obtained in Step (f) for $v \in V_R$, receiver R creates pairs <v,$f_{eS}(f_{eR}(h(v)))$> by replacing $f_{eR}(h(v))$ with the corresponding v; and (h) receiver R selects all $v \in V_R$ for which $(f_{eS}(f_{eR}(h(v))) \in Z_S$ to form $V_S \cap V_R$.

6. A general purpose computer system programmed with instructions for processing an equijoin type query spanning separate databases while revealing only minimal information beyond a query answer, the instructions comprising:

(a) sender S and receiver R each apply a hash function h to their respective attribute value sets, $X_S = h(V_S)$ and $X_R = h(V_R)$;

(b) receiver R chooses a secret key er $\in$ KeyF and sender S chooses two secret keys es, e's $\in$ KeyF;

(c) receiver R encrypts its hashed set $Y_R = f_{eR}(X_R) = f_{eR}(h(V_R))$;

(d) receiver R sends its encrypted set $Y_R$ to sender S, reordered lexicographically;

(e) sender S encrypts each $y \in Y_R$ with both key $e_S$ and key $e'_S$, and sends back to R 3-tuples <y, $f_{eS}(Y)$, $f_{e'S}(y)$>=<$f_{eR}(h(v))$,$f_{eS}(f_{eR}(h(v)))$,$f_{e'S}(f_{eR}(h(v)))$>;

(f) for each $v \in V_S$, sender S:

(g) encrypts the hash h(v) with $e_S$, obtaining $f_{eS}(h(v))$;

(h) generates key $K(v) = f_{e'S}(h(v))$ for extra information ext(v) using $e'_S$;

(i) encrypts said extra information $c(v) = K(\kappa(v), ext(v))$;

(j) forms a pair <$f_{eS}(h(v))$, c(v)>=<$f_{eS}(h(v))$,$K(f_{e'S}(h(v))$, ext(v))>;

(k) ships said pair to receiver R in lexicographical order;

(l) receiver R applies $f^{-1}_{eR}$ to all entries in the 3-tuples received at step (e), obtaining <h(v), $f_{eS}(h(v))$,$f_{e'S}(h(v))$> for all $v \in V_R$;

(m) receiver R sets aside all pairs <$f_{eS}(h(v))$, $K(f_{e'S}(h(v))$, ext(v))> received at step (f) when a first entry occurs as a second entry in a 3-tuple <h(v), $f_{eS}(h(v))$, $f_{e'S}(h(v))$> from step (l);

(n) receiver R decrypts $K(f_{e'S}(h(v))$, ext(v)) and gets ext(v) using the third entry $f_{e'S}(h(v))=K(V)$ as the key, so that the corresponding v's form the intersection $V_S \cap V_R$; and (o) receiver R uses ext(v) for $v \in V_S \cap V_R$ to compute $T_S \bowtie T_R$.

7. A general purpose computer system programmed with instructions for processing an intersection size type query spanning separate databases while revealing only minimal information beyond a query answer, the instructions comprising:

(a) sender S and receiver R each apply a hash function h to their respective attribute value sets, $X_S = h(V_S)$ and $X_R = h(V_R)$;

(b) sender S and receiver R each choose a random secret key, es $\in$ KeyF for S and er $\in$ KeyF for R;

(c) sender S and receiver R each encrypt their respective hashed sets, $Y_S = f_{eS}(X_S) = f_{eS}(h(V_S))$ and $Y_R = f_{eR}(X_R) = f_{eR}(h)(V_R))$;

(d) receiver R sends to sender S its encrypted set $Y_R = f_{eR}(h(V_R))$, reordered lexicographically;

(e) sender S sends its set $Y_S = f_{eS}(h(V_S))$ to receiver R, reordered lexicographically;

(f) sender S encrypts each $y \in Y_R$ with S's key $e_S$ and sends back to R the set $Z_R = f_{eS}(Y_R) = f_{eS}(f_{eR}(h(V_R)))$, reordered lexicographically;

(g) receiver R encrypts each $y \in Y_S$ with $e_R$, obtaining $Z_S = f_{eR}(f_{eS}(h(V_S)))$ and (h) receiver R computes intersection size $|Z_S \cap Z_R|$, which equals $|V_S \cap V_R|$.

8. A general purpose computer system programmed with instructions for processing an equijoin size type query spanning separate databases while revealing only minimal information beyond a query answer, the instructions comprising:

(a) sender S and receiver R each apply a hash function h to their respective attribute value sets, $X_S = h(V_S)$ and $X_R = h(V_R)$;

(b) sender S and receiver R each choose a random secret key, es $\epsilon$r KeyF for S and er $\epsilon$r KeyF for R;

(c) sender S and receiver R each encrypt their respective hashed sets, $Y_S = f_{eS}(X_S) = f_{eS}(h(V_S))$ and $Y_R = f_{eR}(X_R) = f_{eR}(h)(V_R))$;

(d) receiver R sends to sender S its encrypted set $Y_R = f_{eR}(h(V_R))$, reordered lexicographically;

(e) sender S sends its set $Y_S = f_{eS}(h(V_S))$ to receiver R, reordered lexicographically;

(f) sender S encrypts each $y \in Y_R$ with S's key $e_S$ and sends back to R the set $Z_R = f_{eS}(Y_R) = f_{eS}(f_{eR}(h(V_R)))$, reordered lexicographically;

(g) receiver R encrypts each $y \in Y_S$ with $e_R$, obtaining $Z_S = f_{eR}(f_{eS}(h(V_S)))$; and (h) receiver R computes join size $|V_R \bowtie V_S|$, wherein $V_R$ and $V_S$ may contain duplicates.

\* \* \* \* \*